INVENTORS
KENNETH R. BANGERTER
OTMAR M. ULBING
HARRY S. BENNETT
BY
David W. Tilbott
ATTORNEY Nov. 22, 1966  K. R. BANGERTER ETAL  3,286,989
BALANCING HOIST Filed Oct. 19, 1965  4 Sheets-Sheet 2

INVENTORS
KENNETH R. BANGERTER
OTMAR M. ULBING
HARRY S. BENNETT
BY
David W. Tillett
ATTORNEY Nov. 22, 1966  K. R. BANGERTER ETAL  3,286,989
BALANCING HOIST Filed Oct. 19, 1965  4 Sheets-Sheet 3

INVENTORS
KENNETH R. BANGERTER
OTMAR M. ULBING
HARRY S. BENNETT
BY
David W. Tillotson
ATTORNEY Nov. 22, 1966    K. R. BANGERTER ETAL    3,286,989
BALANCING HOIST Filed Oct. 19, 1965    4 Sheets-Sheet 4

INVENTORS
KENNETH R. BANGERTER
OTMAR M. ULBING
HARRY S. BENNETT
BY
David W. Tibbitts
ATTORNEY

3,286,989
BALANCING HOIST

Kenneth R. Bangerter, Ithaca, and Otmar M. Ulbing, Berkshire, N.Y., and Harry S. Bennett, Sayre, Pa., assignors to Ingersoll-Rand Company, New York, N.Y., a corporation of New Jersey
Filed Oct. 19, 1965, Ser. No. 497,884
7 Claims. (Cl. 254—168)

This invention relates to a balancing hoist of the type that can provide a lifting force substantially balancing a load whereby the load can be floated and can be raised or lowered by the application of a relatively small force to the load. This type of hoist is particularly convenient for holding a work piece which must be moved into a variety of positions while work is being performed on it.

In general, balancing hoists are old. Various designs of this type of hoist have been merchandised in the past. Most of these old hoists have suffered from one or more disadvantages, such as being difficult to operate, unreliable, dangerous, expensive to manufacture, and subject to failure.

The principal object of this invention is to provide a new type of balancing hoist which substantially eliminates or minimizes the disadvantages of earlier balancing hoists.

Further important objects of this invention are: to provide a balancing hoist which is reliable and safe to operate; to provide a balancing hoist having relatively small friction losses in its moving parts; to provide a balancing hoist which maintains the depending portion of its hoisting cable in substantially the same vertical plane throughout its movement; to provide a balancing hoist having relatively few parts and which is relatively inexpensive to manufacture; to provide a balancing hoist which can be operated with very little effort; and to provide a balancing hoist containing a drum which is supported substantially in the same vertical plane that the load is applied to the drum throughout the movement of the hoist so the drum is free of substantially all axially tilting forces which might otherwise cause the drum to bind.

The invention is described in connection with the accompanying drawings wherein.

Figure 1:
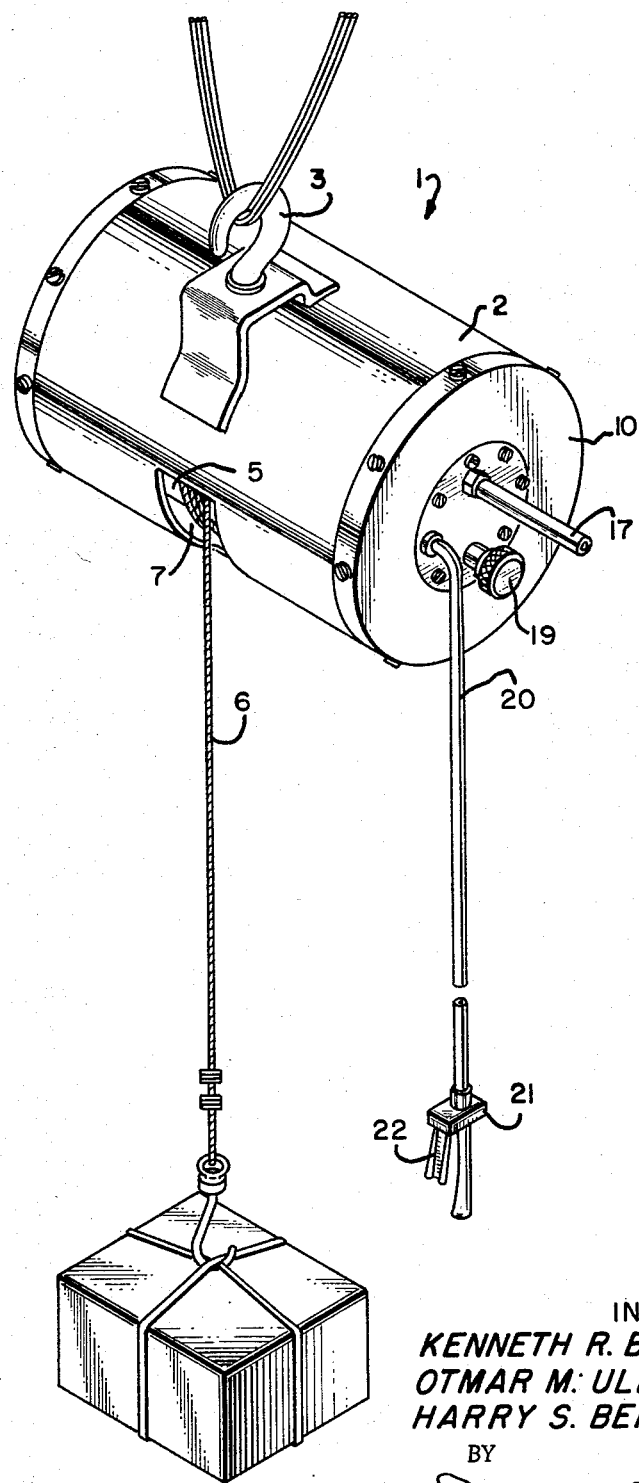
FIG. 1 is a perspective view of the balancing hoist of this invention shown supporting a load.

The balancing hoist 1 shown in FIG. 1 includes an outer casing 2 supported by a hook 3 which may be hung on a suitable overhead support, such as the wire shown in FIG. 1. The balancing hoist 1 further includes a hoist drum 5 contained in the casing 2 and a hoisting cable 6 wound on the drum with a portion depending from the drum through an open slot 7 formed in the casing 2. All of the foregoing structure is conventional in the hoist art.

Figure 2:
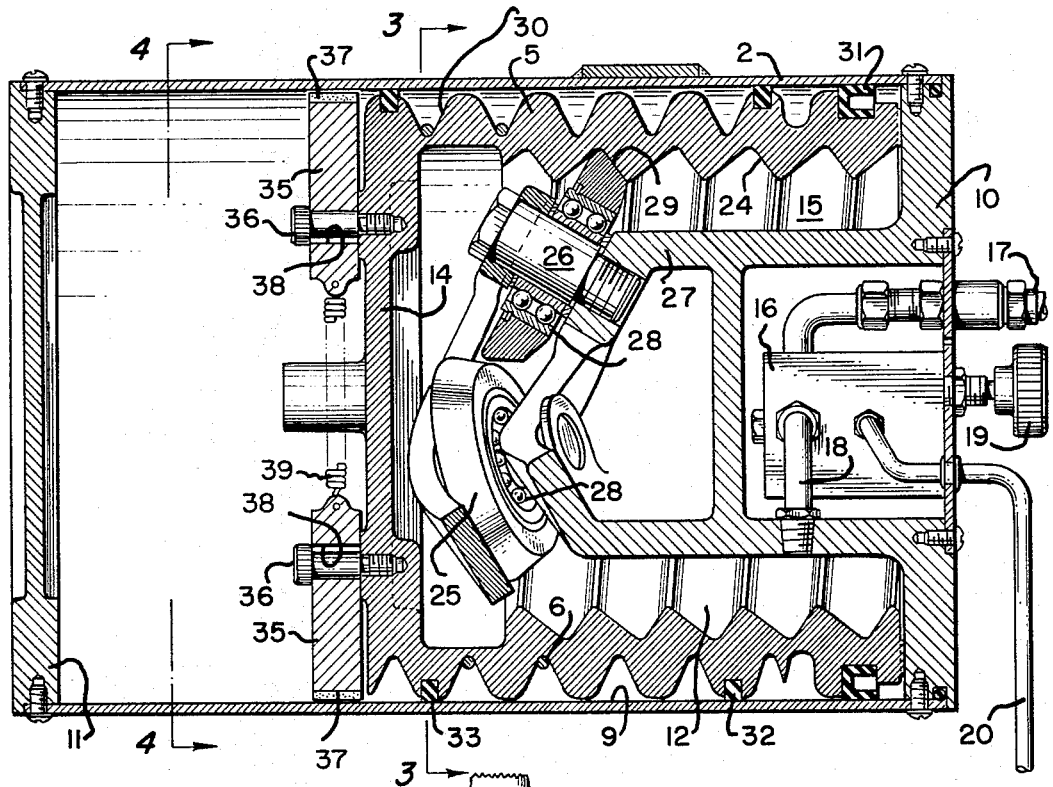
FIG. 2 is an axial section of the balancing hoist of FIG. 1.

The hoist casing 2 contains an internal cylindrical bore 9 which is capped at its opposite ends by a right end wall 10 and a left end wall 11 mounted on the casing 2, as shown in FIG. 2. The drum 5 is mounted in the bore 9 to rotate and move axially therein. The drum 5 contains an internal cavity 12 which is closed at the left end of the drum by an end wall 14, as shown in FIG. 2. The drum 5 cooperates with the casing 2 and the right end wall 10 of the casing 2 to form a closed air chamber 15 therebetween. It is easily seen that the introduction of pneumatic pressure into the air chamber 15 will urge the drum 5 to the left in the casing 2, as shown in FIG. 2.

An adjustable pressure regulator 16 is mounted in the right end wall 10, as shown in FIG. 2 and is supplied with air pressure through a hose 17. The pressure regulator 16 is connected to an outlet pipe 18 which opens into the air chamber 15 from the pressure regulator 16. The pressure regulator 16 reduces the air pressure supplied to it through the supply hose 17 to a predetermined regulated pressure and feeds such reduced pressure through the outlet pipe 18 into the air chamber 15. In addition, the pressure regulator automatically regulates the pressure in the air chamber 15 and maintains it at a predetermined pressure. The pressure regulator 16 includes an adjustment knob 19 for varying the regulated pressure in the air chamber 15.

FIGS. 1 and 2 further illustrate an exhaust hose 20 having its upper end connected to the regulator 16 and depending from the right end wall 10 of the hoist. The lower end of the exhaust hose 20 includes a hand-operated valve 21 including a hand lever 22. The lever 22 is operated by an operator to either open or close the valve 21. When the valve 21 is open, it exhausts the hose 20 to atmosphere which, in turn, dumps the pressure fed to the outlet pipe 18 and the air chamber 15. So long as the valve 21 remains open, it prevents the build-up of pressure in the air chamber 15.

The interior of the drum 5 is provided with an internal helical thread 24, as shown in FIG. 2. The thread 24 is engaged by a group of three rollers 25 which are pivoted on bolts 26 mounted on the inner end of a bracket 27 formed integrally on the right end wall 10 of the casing 2. The bracket 27 projects concentrically inward from the right end wall 10 in the bore 9 and is sufficiently small to fit into the cavity 12 of the drum 5. The rollers 25 include ball bearings 28 to reduce friction. In addition, the rollers 25 have tapered or conical peripheries 29 and are mounted on axes arranged at acute angles to the axis of the bore 9. One reason for making the rollers 25 with conical peripheries 29 is to enable them to have a nearly pure rolling action on the surface of the thread 24, thus minimizing the sliding of the rollers 25. As noted in the drawing, the rollers 25 are located near a vertical plane extending through the slot 7 in the casing 2. Thus the rollers 25 will support the drum 5 substantially in a vertical plane extending through the slot 7.

Figure 3:
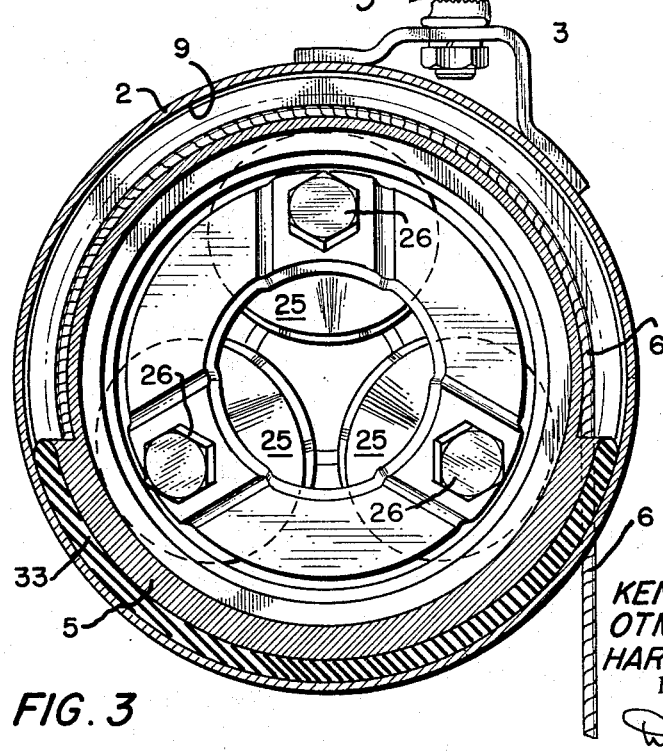
FIG. 3 is a section taken on line 3—3 of FIG. 2.

The helical thread 24 on the interior of the drum 5 is arranged so that when the drum rotates in a counterclockwise direction, as shown in FIG. 3, the drum will move axially to the left, as shown in FIG. 2. As a result, pneumatic pressure in the air chamber 15 will act to urge the drum 5 toward the left, as shown in FIG. 2, and in a counterclockwise rotary direction, as shown in FIG. 3.

The exterior of the drum 5 includes a helical groove 30 for containing the hoisting cable 6. The helix of the groove 30 has the same direction of rotation as the thread 24. Preferably, the pitch or distance between adjacent turns of the groove 30 is the same as the pitch of the helical thread 24 on the inside of the drum 5. This relationship will maintain the depending portion of the cable 6 in a stationary vertical plane as the drum 5 moves back and forth in the casing 2 during the unwinding or winding of the hoist cable 6. Since the rollers 25 support the drum near the vertical plane extending through the depending portion of the cable 6, there will be little or no force on the drum tending to tilt it in the bore 9.

The exterior of the hoist drum 5 contains several seals 31, 32, and 33 for sealing the clearance between the drum 5 and the interior of the bore 9 to prevent leakage from the air chamber 15.

Figure 4:
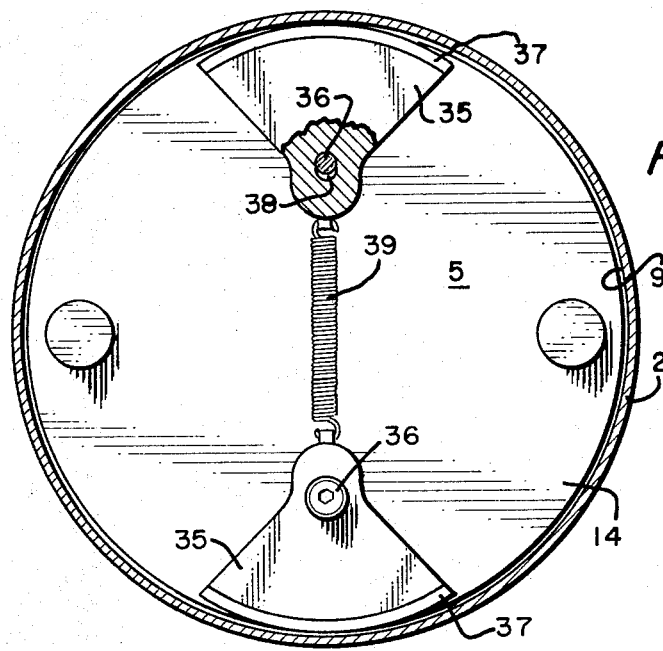
FIG. 4 is a section taken on line 4—4 of FIG. 2 showing the brake of the hoist.
Figure 6:
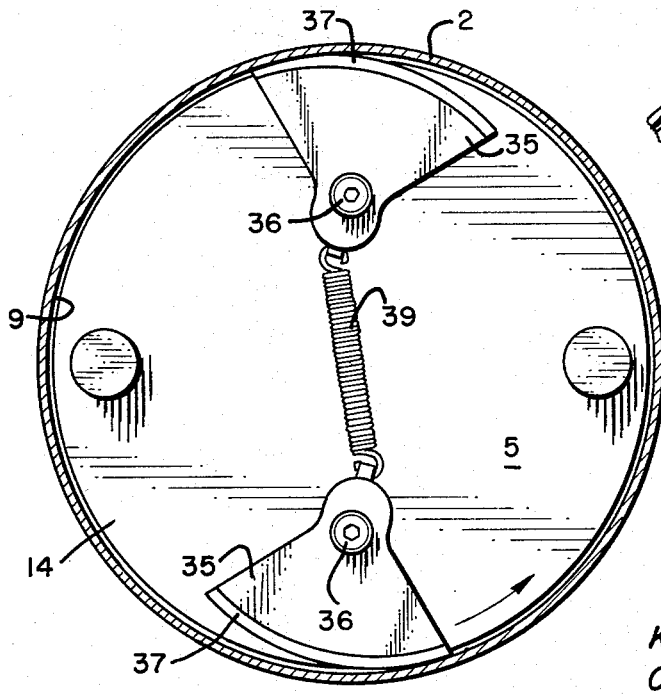
FIG. 6 is a view similar to FIG. 4 showing the brake in a locked braking position.
Figure 5:
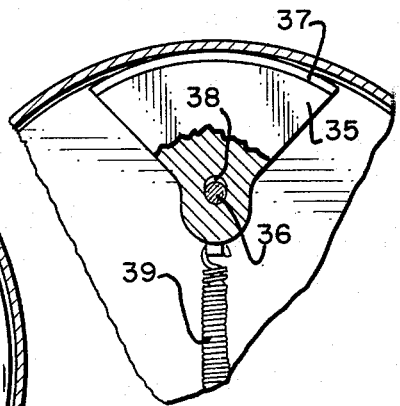
FIG. 5 is a fragmentary view similar to FIG. 4 showing a brake shoe pressed outward against the drum by centrifugal force.

The drum 5 contains brake means for automatically braking the rotation of the drum in the event that its speed exceeds a safe, predetermined maximum speed. This brake means also prevents the drum from accelerating at an excessive rate. This brake means comprises a pair of fan-shaped brake shoes 35 pivoted on bolts 36 located diametrically opposite each other on opposite sides of the end wall 14 of the drum 5 and eccentrically relative to the axis of the drum 5. The brake shoes 35 are illustrated in FIGS. 4 to 6. Each brake shoe contains an arcuate brake lining or surface 37 located adjacent the interior wall of the bore 9. Generally, the radius of the arcuate lining 37 can be substantially the same as the radius of the bore 9.

Each brake shoe 35 includes an elongated slot 38 containing the retaining bolt 36 so that the brake shoe 35 can move radially a limited amount. When the shoe 35 is positioned with the bolt 36 fitting in the outer end of the slot 38, the brake lining 37 is spaced slightly from the wall of the bore 9 so that the drum 5 is free to turn. This is the normal relationship of the brake shoes 35 and they are retained in their radially inward position, as shown in FIG. 4, by a spring 39 extending diametrically between the two brake shoes 35.

When the rotation of the drum 5 exceeds a given speed, the centrifugal force of the brake shoes 35 will draw the shoes 35 radially outward against the spring 39 so that the brake lining 37 engages the bore wall 9, as shown in FIG. 5. As soon as engagement between the shoes and the bore wall 9 takes place, the brake shoes 35 will be pivoted into a braking position wherein the shoes are wedged against the bore wall by the rotation of the drum 5, as shown in FIG. 6. At this moment the drum 5 comes to a halt. Obviously, the speed at which the brakes 35 will become locked to stop the drum 5 will depend on the strength of the spring 39. Generally, the brake shoes 35 will not be used in normal operation of the hoist 1; they simply serve as a safety means in case the drum 5 exceeds its safe speed, such as might happen if the pressure suddenly escaped from the air chamber 15 while the hoist 1 is supporting a load.

In addition, the brake shoes 35 also react to brake the drum 5 under excessive acceleration of the drum. Under excessive acceleration of the drum 5, above a desired acceleration rate, the brake shoes 35 will pivot about the bolts 36 out of a generally radial plane until the brake lining 37 engages the interior of the drum 5. The pivoting of the brake shoes 35 is the result of the mass of the brake shoes resisting acceleration with the drum 5. As soon as engagement of the lining 37 with the drum occurs, the brake shoes 35 are wedged into a braking position by the rotation of the drum 5, as shown in FIG. 6. The tension of the spring 39 will determine the minimum acceleration rate that will cause the brakes to lock the drum 5.

Figure 7:
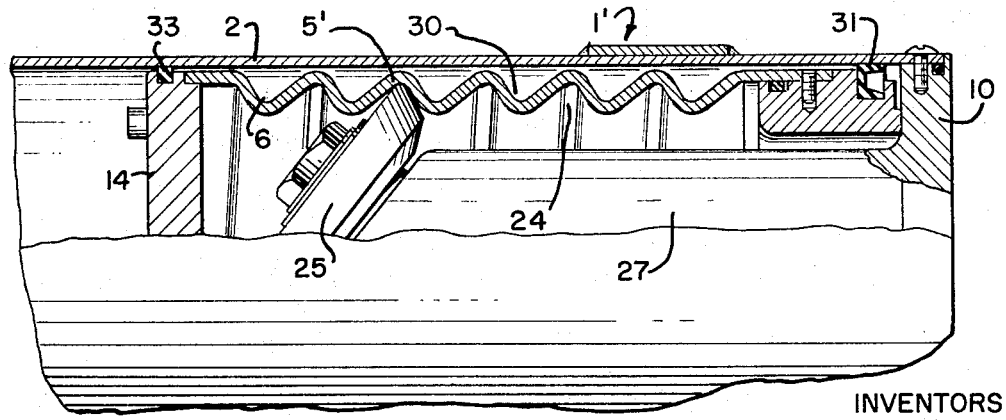
FIG. 7 is a fragmentary axial section of a second embodiment of the invention.

*FIG. 7 (Embodiment)*

The embodiment of hoist 1' shown in FIG. 7 is essentially identical to the first embodiment except that the drum 5' is formed of sheet metal with a uniform thickness provided along the length of the internal helical thread 24 and the helical groove 30 on the exterior of the drum. In other words, the exterior groove 30 is formed as the natural result of forming sheet metal to provide the internal thread 24. The drum 5' may be formed from a drawn sheet metal cup using an explosive or spark discharge metal-forming technique.

Figure 8:
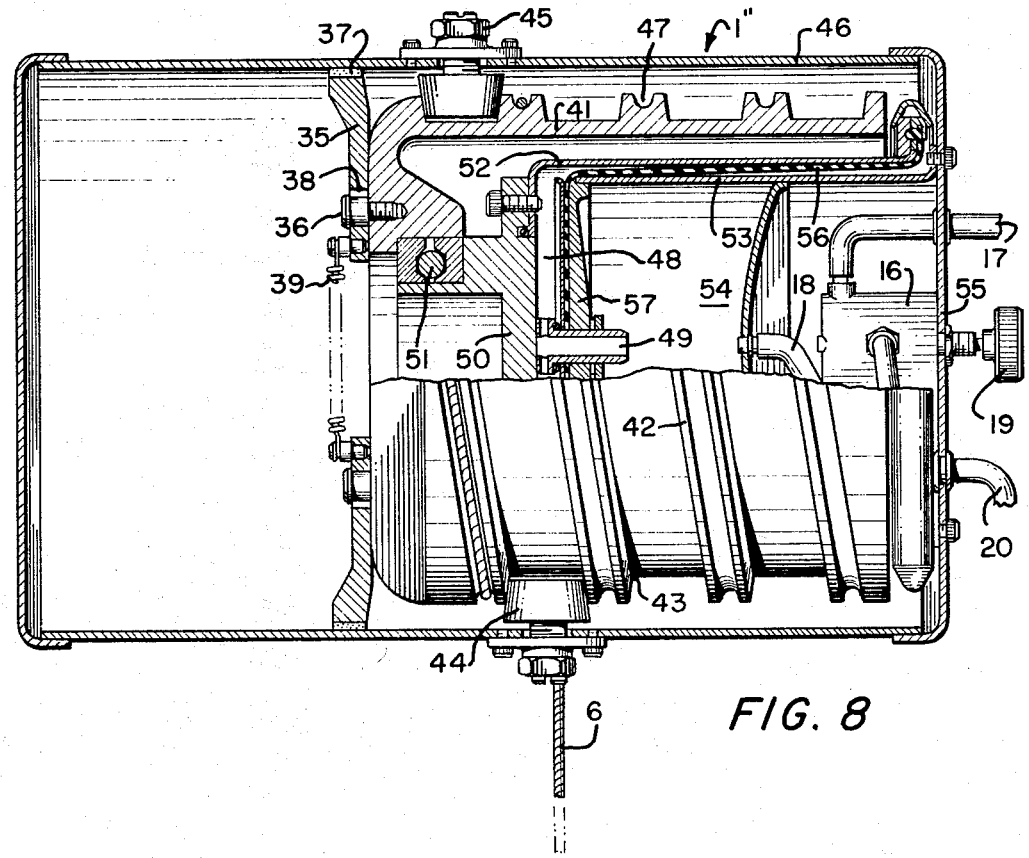
FIG. 8 is an axial section of a third embodiment of the invention.

*FIG. 8 (Embodiment)*

The embodiment of hoist 1" shown in FIG. 8 differs from the first embodiment by having the drum-supporting rollers located on the exterior of the drum. The drum 41 includes a raised helical rib 42 encircling its exterior and having conical sidewalls 43 providing a thread for engaging a group of conical rollers 44. The rollers 44 are rotatably mounted on bolts or studs 45 fastened to the interior of the outer casing 46. The top of the helical rib 42 contains a groove 47 for holding and guiding the hoist cable 6. As shown in FIG. 8, the turns of the cable 6 wind by the rollers 44 without interference with each other.

An axial air load force is applied to the drum 41 by the application of air pressure to a loading chamber 48 through the port 49. The chamber 48 is formed in part by an end wall 50 connected to the outer end of the drum 41 by a bearing 51, which allows relative rotation therebetween. The end wall 50 carries an annular flange 52 adapted to nest over the walls 53 of an inner air chamber 54 mounted on the end wall 55 of the casing 46. In addition, the outer edge of the flange 52 is connected to a flexible diaphragm 56 which is also connected to the inner end 57 of the inner chamber 54. The diaphragm 56 maintains a seal between the flange 52 and the walls 53 while allowing the loading chamber 48 to vary in volume, as the drum 41 moves axially in the casing 46. The bearing 51 prevents the axially moving and rotating drum 41 from also rotating the end wall 50.

The control means for the embodiment of FIG. 8 is the same as in the earlier embodiment and includes the pressure regulator 16, the supply hose 17, the outlet pipe 18, the pressure regulator control handle 19, and the exhaust hose 20. The outlet pipe 18 applies the regulated air pressure to the inner chamber 54 which flows through the port 49 to the loading chamber 48. The third embodiment 1" also uses the same automatic brake means as described in connection with the first embodiment.

Although several embodiments of the invention are illustrated and described in detail, it will be understood that the invention is not limited merely to these embodiments, but contemplates other embodiments and variations which utilize the concepts and teachings of this invention.

Having thus described our invention, we claim:
1. A balancing hoist comprising:
   a casing containing a cylindrical bore and including means for mounting the casing on a support with the axis of said bore extending substantially horizontally;
   a hollow hoist drum contained in said cylindrical bore for rotating in it and moving axially along it;
   a hoisting cable wrapped around the exterior of said drum and depending through an opening in said casing;
   the inner surface of said drum being provided with an internal female helical thread;
   a bracket mounted on said casing and projecting axially into said drum;
   a group of rollers rotatively mounted on said bracket and positioned to ride in said helical thread so that said drum is caused to rotate as it moves axially in said bore;
   a first cover fixed on an end of said bore and a second cover fixed on an end of said drum to cooperate with the walls of said bore to form a closed fluid chamber;
   means for supplying pneumatic pressure to said chamber;
   means for controlling and varying the pneumatic pressure in said chamber to provide a selected force in said chamber serving to bias said drum axially in said bore;
   said helical thread being arranged to rotate in one direction under said force; and
   said hoisting cable being wound on said drum in a direction such that it is wound up on the drum as said drum rotates in said one direction.

2. The balancing hoist of claim 1 wherein:
   said drum includes a helical groove on its exterior receiving said hoisting cable and having a pitch corresponding with the pitch of said internal helical thread so that the depending portion of said cable remains substantially in the same vertical plane as said drum rotates.

3. The balancing hoist of claim 3 wherein:
said drum is of substantially a uniform thickness throughout substantially its entire circumferential surface and has said internal helical groove being located longitudinally between adjacent turns of said exterior helical groove.

4. The balancing hoist of claim 1 including:
a sealing ring mounted on the periphery of said drum and engaging the walls of said bore to restrict leakage from said chamber between said bore and said drum.

5. The balancing hoist of claim 1 including:
said rollers are located axially in said drum near the vertical plane containing the portion of the hoisting cable depending from said drum.

6. The balancing hoist of claim 1 including:
a brake shoe pivoted on a pivot mounted on said drum at a point offset from the axis of said drum, said pivot including means for allowing said shoe to move radially outward against said bore;
said brake shoe having an arcuate surface with the radius of said arcuate surface being substantially the same as the radius of said bore; and
resilient means acting to urge said shoe radially inward on said pivot to maintain said shoe spaced from said bore;
said resilient means being sufficiently weak to allow centrifugal force to draw said shoe radially outward against said bore at a predetermined speed whereby engagement of the shoe against the bore swings the shoe on its axis into a position wedging the shoe against the bore in a locking position.

7. The balancing hoist of claim 6 including a pair of said brake shoes pivoted on said drum at diametrically opposed points; and
said resilient means is a spring extending between said pair of shoes tending to hold said shoes in their inner positions spaced from the bore.

References Cited by the Examiner
UNITED STATES PATENTS

| | | | |
|---|---|---|---|
| 2,478,494 | 8/1949 | Martin | 242—86 |
| 2,702,674 | 2/1955 | Willson | 242—86 |
| 2,710,107 | 6/1955 | Powell | 254—168 |
| 2,868,504 | 1/1959 | Minty | 254—186 |
| 2,896,912 | 7/1959 | Faugier | 254—159 |
| 3,109,615 | 11/1963 | Fritz | 254—150 |

EVON C. BLUNK, *Primary Examiner.*

H. C. HORNSBY, *Assistant Examiner.*